(12) United States Patent
Mastrocola et al.

(10) Patent No.: US 11,529,935 B2
(45) Date of Patent: Dec. 20, 2022

(54) HYDRAULIC BRAKING SYSTEM AND METHOD

(71) Applicant: Goodrich Corporation, Charlotte, NC (US)

(72) Inventors: Naison E. Mastrocola, Goshen, CT (US); Tyler Arsenault, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 66 days.

(21) Appl. No.: 17/227,999

(22) Filed: Apr. 12, 2021

(65) Prior Publication Data

US 2021/0229644 A1  Jul. 29, 2021

Related U.S. Application Data

(62) Division of application No. 16/146,441, filed on Sep. 28, 2018, now Pat. No. 11,001,238.

(51) Int. Cl.
| | |
|---|---|
| *B60T 8/17* | (2006.01) |
| *B60T 8/174* | (2006.01) |
| *B60T 8/30* | (2006.01) |
| *B60T 13/66* | (2006.01) |
| *B60T 15/14* | (2006.01) |
| *F15B 13/04* | (2006.01) |
| *F15B 15/08* | (2006.01) |

(52) U.S. Cl.
CPC ............ *B60T 8/1703* (2013.01); *B60T 8/174* (2013.01); *B60T 8/306* (2013.01); *B60T 13/662* (2013.01); *B60T 15/14* (2013.01); *F15B 13/0401* (2013.01); *F15B 15/088* (2013.01); *F05D 2260/406* (2013.01); *F05D 2270/301* (2013.01); *F05D 2270/64* (2013.01); *F15B 2013/0409* (2013.01)

(58) Field of Classification Search
CPC ........ B60T 8/1703; B60T 8/174; B60T 8/306; B60T 13/662; B60T 15/14; B64C 25/44; F15B 13/0401; F15B 15/088; F15B 2013/0409; F05D 2260/406; F05D 2270/301; F05D 2270/64
See application file for complete search history.

(56) References Cited

U.S. PATENT DOCUMENTS

| | | |
|---|---|---|
| 6,003,640 A | 12/1999 | Ralea |
| 6,471,015 B1 | 10/2002 | Ralea |
| 6,522,967 B1 | 2/2003 | Pfeil |
| 7,475,537 B2 | 1/2009 | Spickard |

(Continued)

*Primary Examiner* — Xuan Lan Nguyen
(74) *Attorney, Agent, or Firm* — Getz Balich LLC

(57) ABSTRACT

A braking system including a brake actuator, a control valve, a control assembly, and at least one pressure sensor. The control valve is disposed to direct hydraulic fluid to the brake actuator at a rate corresponding to a magnitude of a control signal. The control assembly includes a mixed-mode control system. The at least one pressure sensor is configured to measure a pressure of the hydraulic fluid to the brake actuator. The control assembly is configured to determine a position of the brake actuator. The mixed-mode control system is configured to determine a position command and a pressure command. The mixed-mode control system is configured to adjust the magnitude of the control signal based on at least one of the position command and the pressure command so as to reposition the brake actuator from a first position to a second position.

20 Claims, 4 Drawing Sheets

(56) References Cited

U.S. PATENT DOCUMENTS

| | | |
|---|---|---|
| 8,180,548 B2 | 5/2012 | Cahill |
| 8,666,625 B1 | 3/2014 | Georgin |
| 9,841,039 B2 | 12/2017 | Adams |
| 2004/0154884 A1 | 8/2004 | Thomas |
| 2007/0235267 A1 | 10/2007 | Liebert |
| 2010/0276989 A1 | 11/2010 | Metzger, Jr. |
| 2011/0018337 A1 | 1/2011 | King |
| 2017/0174331 A1 | 6/2017 | Georgin |

HYDRAULIC BRAKING SYSTEM AND METHOD

This application is a divisional of U.S. patent application Ser. No. 16/146,441 filed Sep. 28, 2018, which is hereby incorporated herein by reference in its entirety.

BACKGROUND

1. Technical Field

This disclosure relates generally to braking systems, and more particularly to hydraulic braking systems for use in a vehicle.

2. Background Information

Historically, pressure-only feedback control systems for aircraft brake control have resulted in a phenomenon referred to as "brake fill." During brake fill, a control valve (e.g., an electro-hydraulic servo valve (EHSV)) is directing fluid into a hydraulic brake actuator but the brake actuator has not yet established sufficient hydraulic fluid volume to build hydraulic pressure in the system. As a result, during brake fill there is no palpable feedback from the hydraulic pressure sensor to a control system for determining when contact will be made between the brake piston of the hydraulic actuator and the heat sink (i.e., the brake pad).

As one of ordinary skill in the art would appreciate, this brake fill period presents a number of challenges during braking operations. For example, during a pilot-initiated braking operation, the resulting brake fill period will increase the amount of time between initiation of the pilot-initiated braking command and contact between the brake piston of the hydraulic actuator and the heat sink. This brake fill period may also be referred to as a "dead zone" because a braking operation has been initiated but no braking action has occurred. Further, the rapid increase in hydraulic pressure once sufficient fluid volume has accumulated in the hydraulic actuator may result in inadequate controller performance and excessive braking force. Pressure-only feedback to a control system may not enable the control system response to adequately respond to the rapidly increasing hydraulic pressure, thereby permitting a hydraulic pressure overshoot beyond the commanded brake actuator pressure (i.e., integrator windup).

SUMMARY

According to an aspect of the present disclosure, a method of mixed-mode logic control for a hydraulic braking system is provided. A control signal is applied to a control valve. Hydraulic fluid is directed, with the control valve, to a brake actuator based on a magnitude of the control signal. A pressure of the hydraulic fluid to the brake actuator is measured. A position of the brake actuator is determined. A position command and a pressure command are determined based on the position of the brake actuator and the pressure, respectively. The magnitude of the control signal is adjusted based on at least one of the position command and the pressure command so as to reposition the brake actuator from a first position to a second position.

In the alternative or additionally thereto, in the foregoing aspect, a flow rate of the hydraulic fluid to the brake actuator is measured.

In the alternative or additionally thereto, in the foregoing aspect, the position of the brake actuator is a flow-based position based on the flow rate of the hydraulic fluid.

In the alternative or additionally thereto, in the foregoing aspect, adjusting the magnitude of the control signal is based only on the position command as the brake actuator moves between a running clearance position and a zero torque position.

In the alternative or additionally thereto, in the foregoing aspect, the brake actuator is repositioned from the second position to a zero torque position.

In the alternative or additionally thereto, in the foregoing aspect, adjusting the control signal is based on both of the position command and the pressure command.

In the alternative or additionally thereto, in the foregoing aspect, the position command and the pressure command have unequal weight with respect to adjusting the control signal.

According to another aspect of the present disclosure, a braking system includes a brake actuator, a control valve, a control assembly, and at least one pressure sensor. The control valve is disposed to direct hydraulic fluid to the brake actuator at a rate corresponding to a magnitude of a control signal. The control assembly includes a mixed-mode control system. The at least one pressure sensor is disposed between the control valve and the brake actuator and configured to measure a pressure of the hydraulic fluid to the brake actuator. The control assembly is configured to determine a position of the brake actuator. The mixed-mode control system is configured to determine a position command and a pressure command based at least in part on the position of the brake actuator and the pressure, respectively. The mixed-mode control system is configured to adjust the magnitude of the control signal based on at least one of the position command and the pressure command so as to reposition the brake actuator from a first position to a second position.

In the alternative or additionally thereto, in the foregoing aspect, the braking system includes at least one flow detector configured to measure a flow rate of the hydraulic fluid to the brake actuator.

In the alternative or additionally thereto, in the foregoing aspect, the position of the brake actuator is a flow-based position based on the flow rate of the hydraulic fluid.

In the alternative or additionally thereto, in the foregoing aspect, the first position is a running clearance position.

In the alternative or additionally thereto, in the foregoing aspect, the control signal is adjusted based on both of the position command and the pressure command.

In the alternative or additionally thereto, in the foregoing aspect, the position command and the pressure command have unequal weight with respect to adjustment of the control signal.

According to another aspect of the present disclosure, a vehicle includes at least one brake assembly and a braking system. The braking system includes a brake actuator, a control valve, a control assembly, and at least one pressure sensor. The control valve is disposed to direct hydraulic fluid to the brake actuator at a rate corresponding to a magnitude of a control signal. The control assembly includes a mixed-mode control system. The at least one pressure sensor is disposed between the control valve and the brake actuator and configured to measure a pressure of the hydraulic fluid to the brake actuator. The control assembly is configured to determine a position of the brake actuator. The mixed-mode control system is configured to determine a position command and a pressure command based at least in part on the position of the brake actuator and the pressure, respectively. The mixed-mode control system is configured to adjust the magnitude of the control signal based on at least one of the position command and the pressure command so as to reposition the brake actuator from a first position to a second position.

In the alternative or additionally thereto, in the foregoing aspect, the braking system includes at least one flow detector configured to measure a flow rate of the hydraulic fluid to the brake actuator.

In the alternative or additionally thereto, in the foregoing aspect, the position of the brake actuator is a flow-based position based on the flow rate of the hydraulic fluid.

In the alternative or additionally thereto, in the foregoing aspect, the first position is a running clearance position.

In the alternative or additionally thereto, in the foregoing aspect, the control signal is adjusted based on both of the position command and the pressure command.

In the alternative or additionally thereto, in the foregoing aspect, the position command and the pressure command have unequal weight with respect to adjustment of the control signal.

The present disclosure, and all its aspects, embodiments and advantages associated therewith will become more readily apparent in view of the detailed description provided below, including the accompanying drawings.

DETAILED DESCRIPTION

Figure 1:
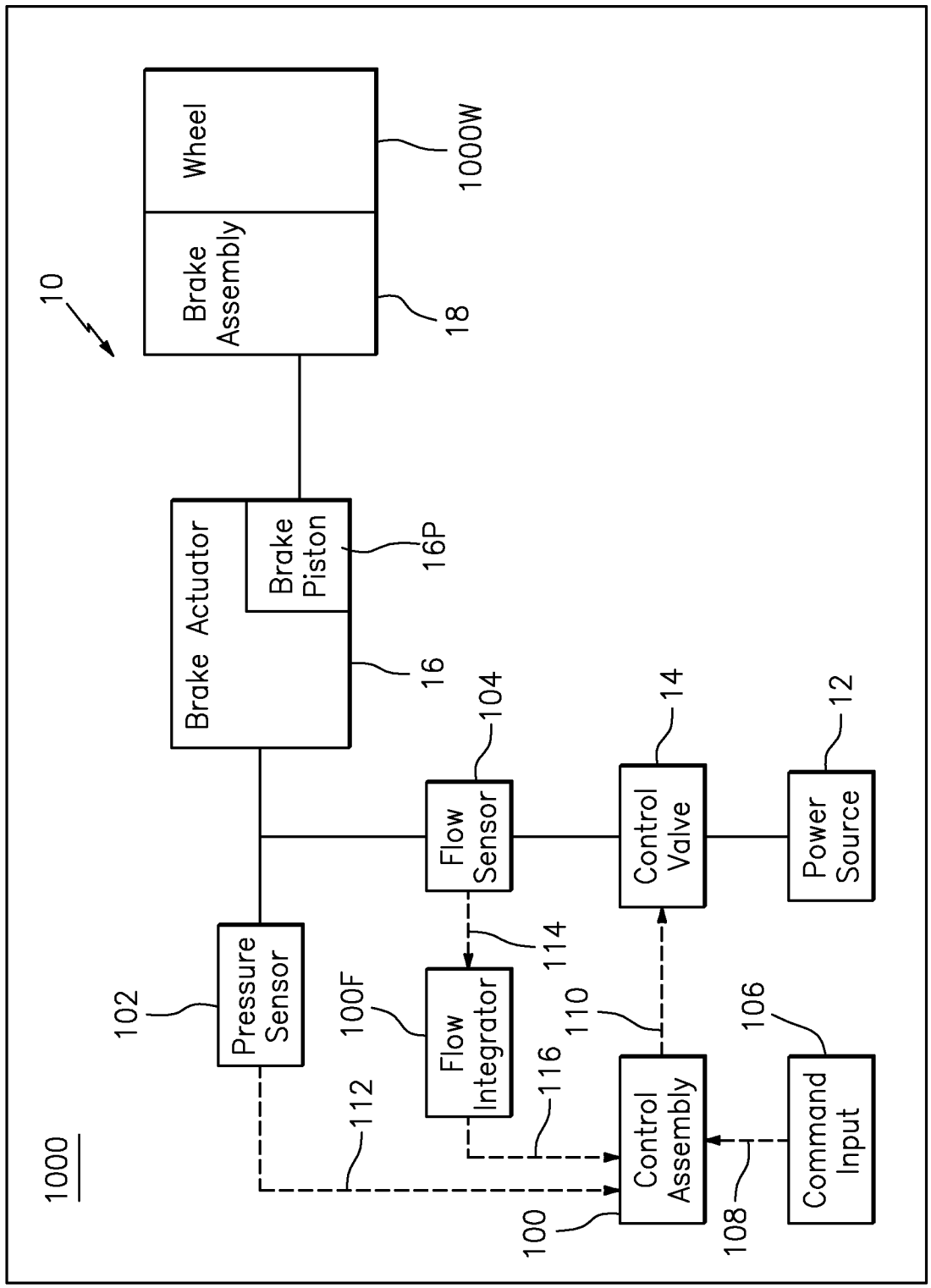
FIG. 1 is a schematic diagram of an exemplary hydraulic brake system according to aspects of the disclosed embodiments.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1, a hydraulic braking system 10 is shown. While the embodiments disclosed herein relate to aircraft hydraulic braking systems, the disclosure is not limited to aircraft hydraulic braking systems and may be used in hydraulic braking systems of any suitable vehicle. Further, the embodiments disclosed herein may be used with any hydraulic actuator and are not limited to use in braking hydraulic actuators. The braking system 10 includes a power source 12, a control valve 14, and a brake actuator 16 including a brake piston 16P. The control valve 14 controls the flow of hydraulic fluid supplied to and from the brake actuator 16 by the power source 12. The brake actuator 16, in turn, effects operation of a brake assembly 18 by extending the brake piston 16P so as to contact and apply a force to the brake assembly 18, thereby applying a braking force (i.e., torque) to a respective wheel 1000W of, for example, an aircraft 1000.

As one of ordinary skill in the art would appreciate, the brake assembly 18 may be configured as a disc brake assembly. In such a configuration, the brake actuator 16 may be positioned adjacent a stack of discs and may be configured to selectively apply a force to the stack in response to a braking operation. Friction that occurs between the discs of the stack, as a result of force applied by, for example, a brake piston 16P of the brake actuator 16, will slow and/or stop the rotation of the respective wheel 1000W of aircraft 1000. Other configurations of brake assemblies may be used, and this disclosure should not be understood to be limited to a particular configuration of brake assembly.

The braking system 10 includes a control assembly 100 configured to control at least a portion of the operation of the braking system 10. Additionally, the control assembly 100 may include at least one controller (not shown). One or more aspects of the control assembly 100 may be performed by one or more of the at least one controller. The braking system 10 includes at least one pressure sensor 102 configured to measure the pressure of the hydraulic fluid supplied to the brake actuator 16 by the control valve 14 and provide a pressure signal 112 (e.g., pressure feedback data) to the control assembly 100. The braking system 10 further includes at least one flow sensor 104 configured to measure the rate of flow of the hydraulic fluid supplied to the brake actuator 16 by the control valve 14 and provide a flow signal 114 (e.g., flow feedback data) to the control assembly 100. While the at least one flow sensor 104 may be described herein as measuring the flow of hydraulic fluid to the brake actuator 16, the at least one flow sensor 104 may also measure the flow of hydraulic fluid from the brake actuator 16 (e.g., while retracting the brake actuator 16 after a braking operation). Both the at least one pressure sensor 102 and the at least one flow sensor 104 may be any conventional pressure or flow sensor, respectively.

The control assembly 100 may be in communication (e.g., signal communication) with one or more of the at least one pressure sensor 102, the at least one flow sensor 104, a flow integrator 100F, the command input 106, the control valve 14, and other aspects of the braking system 10. In some embodiments, one or more of the at least one pressure sensor 102, the at least one flow sensor 104, and the flow integrator 100F may be part of the control assembly 100. The control assembly 100 may include any type of computing device, computational circuit, or any type of process or processing circuit capable of executing a series of instructions that are stored in memory. The control assembly 100 may include any combination of analog and digital components or control signals. The control assembly 100 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the aspects of the braking system 10 (e.g., the control valve 14) and the stored instructions are not limited to any particular form (e.g., program files, system data, buffers, drivers, utilities, system programs, etc.) provided they can be executed by the control assembly 100. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well as a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the control assembly 100 may be achieved via the use of hardware, software, firmware, or any combination thereof. The control assembly 100 may also include input (e.g., a keyboard, a touch screen, etc.) and output devices (e.g., a monitor, sensor readouts, data ports, etc.) that enable the operator to input instructions, received data, etc.

A flow integrator 100F receives the flow signal 114 from the at least one flow sensor 104. The flow integrator 100F integrates and normalizes the flow signal 114 to determine a flow-based position and issues a corresponding flow-based position signal 116. As will be described in further detail, the flow-based position signal 116 may be received by the control assembly 100 for applying or adjusting the control signal 110.

Generally describing the function of the braking system 10, operation of a command input 106 (e.g., a brake pedal configured to be actuated by a pilot) initiates a braking operation by forming a command signal 108 (e.g., an electrical signal) configured to communicate a commanded braking force to the control assembly 100. The command signal 108 may be in the form of an analog signal (e.g., a variable electrical current), a digital signal, or any other suitable medium for communicating a commanded braking force. As will be discussed in further detail, in response to receipt of the command signal 108, the control assembly 100 applies or adjusts a control signal 110 configured to effect operation of the control valve 14 to supply hydraulic fluid to the brake actuator 16. As with the command signal 108, the control signal 110 may be in the form of an analog signal (e.g., a variable electrical current), a digital signal, or any other suitable medium for effecting operation of the control valve 14, which may be the same or a different type of signal as the command signal 108. As will be discussed in further detail, the control assembly 100 may apply or adjust the control signal 110 based on one or more additional signals, such as a pressure signal 112 or a flow-based position signal 116.

Upon receipt of the control signal 110, the control valve 14 operates to supply hydraulic fluid from the power source 12 to the brake actuator 16 at a rate corresponding to a magnitude of the control signal 110 so as to obtain a commanded braking force, which may, for example, correspond to a hydraulic fluid pressure or a position of the brake actuator 16. Initially, as the control valve 14 begins to supply hydraulic fluid to the brake actuator 16, the brake actuator 16 experiences a "brake fill" period wherein the control valve 14 is directing fluid into the brake actuator 16 but the brake actuator 16 has not yet established sufficient hydraulic fluid volume to build hydraulic fluid pressure in the system. As a result, actual braking action (i.e., application of braking force) is delayed until the brake fill period is substantially complete. Once the brake actuator 16 has substantially filled with hydraulic fluid and hydraulic fluid pressure has begun to rise appreciably, the brake piston 16P of the brake actuator 16 will make contact with and apply force to the brake assembly 18.

For example, the brake actuator 16 may initially be in a running clearance position. In the running clearance position, the brake actuator 16 is predetermined distance from the brake assembly 18 to ensure that the brake actuator 16 does not contact the brake assembly 18. Upon receipt of the control signal 110, the control valve 14 may operate to advance the brake actuator 16 from the running clearance position to, for example, a zero torque position. In the zero torque position, the brake actuator 16 is in contact with the brake assembly 18, but does not generate an appreciable braking force, such that the respective wheel 1000W is effectively un-braked (i.e., in the zero torque position, the brake actuator 16 does not apply a force to the brake assembly 18).

Figure 2:
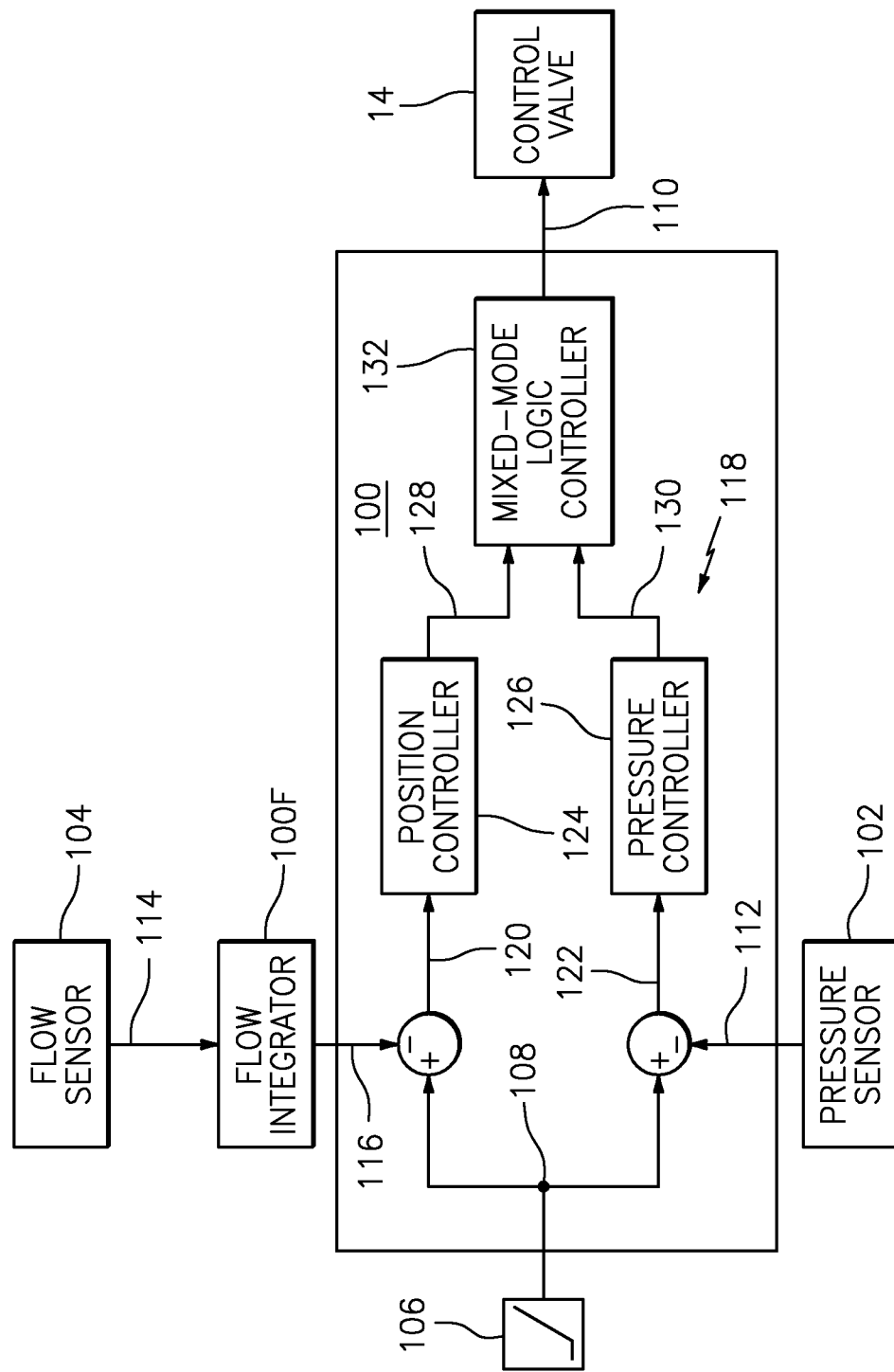
FIG. 2 is a schematic diagram of an exemplary mixed-mode control system for a hydraulic brake system according to aspects of the disclose embodiments.

Referring to FIG. 2, the control assembly 100 includes a mixed-mode control system 118. The mixed-mode control system 118 includes a position controller 124, a pressure controller 126, and a mixed-mode logic controller 132. In some embodiments, the features of the position controller 124, the pressure controller 126, and the mixed-mode logic controller 132 may be performed by a single controller. As discussed above, operation of the command input 106 initiates a braking operation by issuing the command signal 108. The command signal 108, received by the mixed-mode control system 118, may include one or both of a commanded brake actuator position and a commanded brake actuator pressure corresponding to the commanded braking force of the command signal 108. For example, the commanded brake actuator position may be compared to an actuator position signal, such as the flow-based position signal 116, to determine a position error 120 (i.e., a difference between a commanded and actual position of the brake actuator 16). Similarly, the commanded brake actuator pressure may be compared to the pressure signal 112, to determine a pressure error 122 (i.e., a difference between a commanded and actual hydraulic pressure in the brake actuator 16). In some embodiments, the position of the brake actuator 16 may be determined by using a means other than a flow-based position, for example, a mechanical position indication system. In still other embodiments, position of the brake actuator may be determined by using more than one form of position indication (e.g., both a flow-based and a mechanical position indication system).

Figure 3:
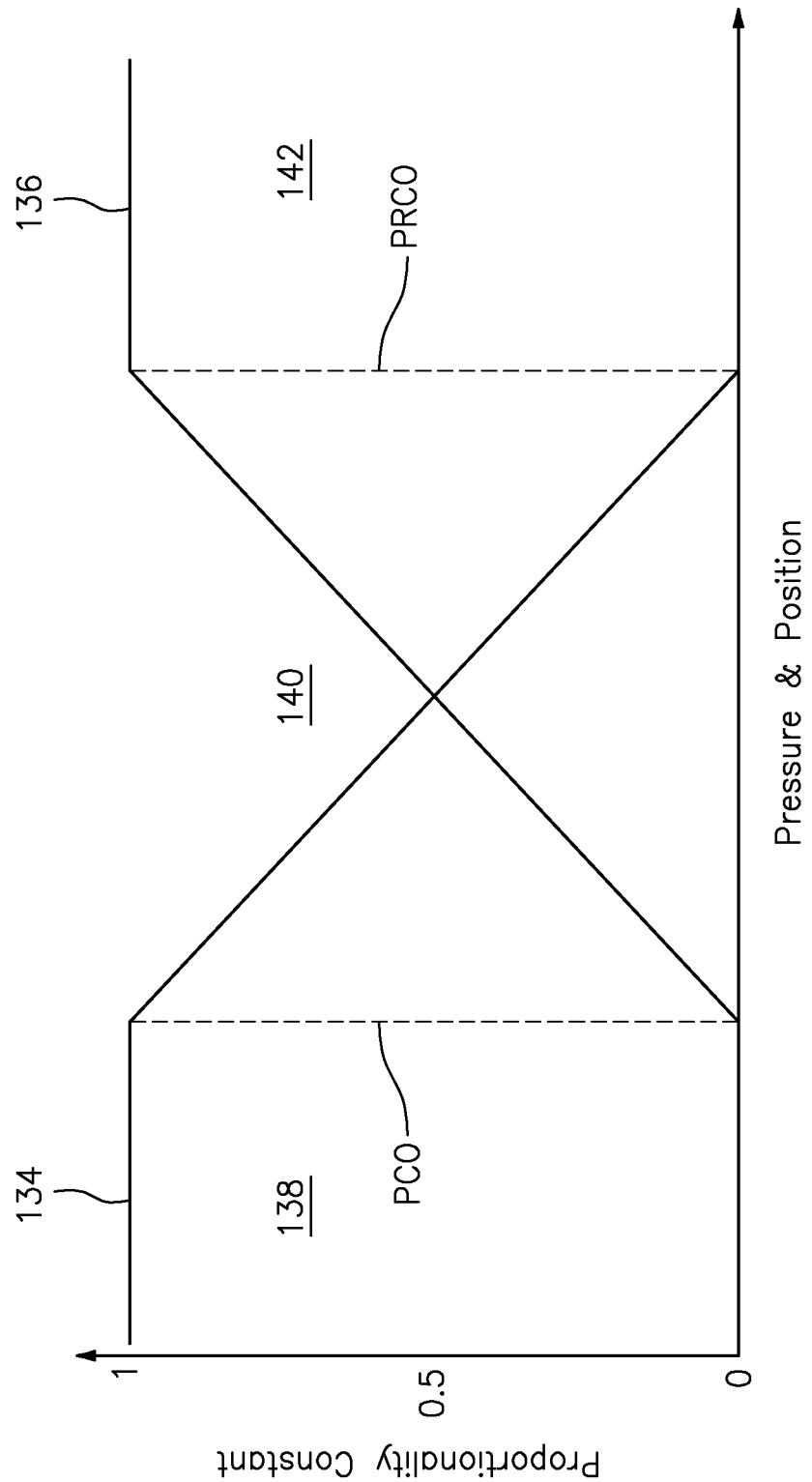
FIG. 3 is a graph illustrating parameters associated with mixed-mode logic according to aspects of the present disclosure.
Figure 4:
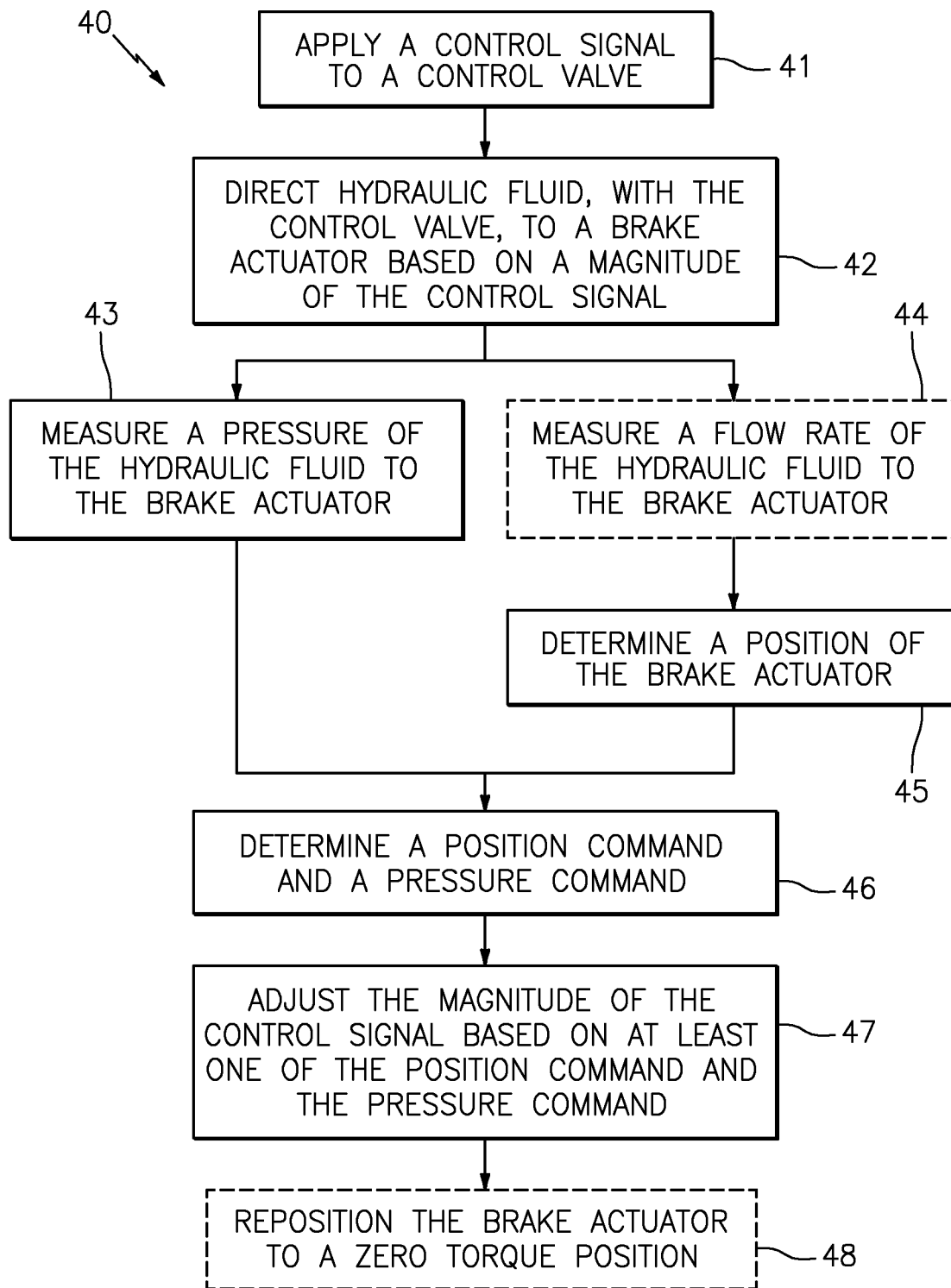
FIG. 4 is a flow diagram of a method for mixed-mode logic control for a hydraulic brake system according to aspects of the disclosed embodiments.

The position controller 124 receives the position error 120 and, based on the magnitude of the position error 120, determines a position command 128 (i.e., a commanded valve position) for the control valve 14. The pressure controller 126 receives the pressure error 122 and, based on the magnitude of the pressure error 122, determines a pressure command 130 (i.e., a commanded valve position) for the control valve 14. The mixed-mode logic controller 132 receives the position command 128 and the pressure command 130 and applies a control signal 110 to the control valve 14. As will be discussed in further detail below, the weight of each of the position command 128 and the pressure command 130 in determining the control signal 110 will be based on a variable proportionality constant 134, 136 assigned to each of the position command 128 and the pressure command 130. As illustrated in FIG. 3, the proportionality constants 134, 136 have a value in a range between 0 and 1 (e.g., a range of 0 to 100 percent could be used equivalently).

During the braking operation, brake actuator position indication and pressure measurements from respective sensors, such as the at least one flow sensor 104, and the at least one pressure sensor 102, provide continuous feedback for recalculation of the position error 120 and the pressure error 122. Accordingly, the control current 110 may be adjusted by the mixed-mode control system 118 in response to changes in the hydraulic pressure and position of the brake actuator 16.

Referring to FIG. 3, the mixed-mode control system 118 may adjust the control signal 110 based on one or both of the position command 128 and the pressure command 130 over the length of brake actuator 16 travel. In the strict position control region 138, the hydraulic pressure in the brake actuator 16 has not begun to rise appreciably, for example, because the brake actuator 16 is not in contact with the brake assembly 18. As the brake actuator 16 travels within the strict position control region 138, the position command 128 will be assigned a position proportionality constant 134 having a value of 1 and the pressure command 130 will be assigned a pressure proportionality constant 136 having a value of 0. As a result, the mixed-mode logic controller 132 will adjust the control signal 110 based on the position command 128 alone. For example, as the brake actuator 16 repositions from the running clearance position to the zero torque position, the mixed-mode logic controller 132 may adjust the control signal 110 based on the position command 128 alone. As the brake actuator 16 continues to approach the brake assembly 18, the mixed-mode logic controller 132 may enter a mixed-mode control region 140 based on exceeding a position control offset PCO. The position control offset PCO defines a position of brake actuator 16 travel wherein hydraulic fluid pressure in the brake actuator 16 has risen sufficiently above the noise floor to provide an adequate pressure signal 112 for brake actuator 16 control. The position control offset PCO may be a predetermined value or, in some embodiments, may be determined by the mixed-mode logic system 118 based on braking system 10 response. The position control offset PCO may be some distance forward or back of the zero torque position or may be the zero torque position itself.

Within the mixed-mode control region 140, the mixed-mode logic controller 132 adjusts the control signal 110 based on both the position command 128 and the pressure command 130. As the brake actuator 16 advances beyond the position control offset PCO, the proportionality constants 134, 136 assigned to the position command 128 and the pressure command 130, respectively, transition so as to assign more weight to the pressure command 130 and less weight to the position command 128 with respect to adjustment of the control signal 110. Accordingly, retracting the brake actuator 16 within the mixed-mode control region 140 would have an opposite effect on the proportionality constants 134, 136.

As can be seen in FIG. 3 for example, as braking force increases within the mixed-mode control region 140, the position proportionality constant 134 will transition from a value of 1 to a value of 0 while the pressure proportionality constant 136 will transition from a value of 0 to a value of 1. For ease of explanation, the proportionality constants 134, 136 are illustrated as having a linear relationship with respect to pressure/position in the mixed-mode control region 140 of FIG. 3, however, the relationship between the proportionality constants 134, 136 and pressure/position is not limited to having a linear relationship.

In some embodiments, the mixed-mode control region 140 may correspond, for example, to a low braking force region of brake actuator 16 operation (e.g., 0-2 percent of full braking force, 0-5 percent of full braking force, or 0-10 percent of full braking force). For example, as the brake actuator 16 continues to advance, the mixed-mode logic system 118 may enter a strict pressure control region 142 based on exceeding a pressure control offset PRCO. The pressure control offset PRCO defines a portion of brake actuator 16 travel wherein hydraulic pressure feedback (i.e. pressure signal 112) is adequate for control of the brake actuator 16 based only on the pressure command 130. In some other embodiments, the mixed-mode control region 140 may correspond to a large braking force region of brake actuator 16 operation, for example, up to substantially the entire range of full braking force.

As the brake actuator 16 travels within the strict pressure control region 142, the pressure command 130 will be assigned the pressure proportionality constant 136 having a value of 1 and the position command 128 will be assigned the position proportionality constant 134 having a value of 0. As a result, the mixed-mode logic controller 132 will adjust the control signal 110 based on the pressure command 130 alone. As higher force braking is completed, for example, as the command input 106 is released, the mixed-mode logic controller 118 may re-enter the strict position control region 138 or mixed-mode control region 140, as appropriate.

Referring to FIGS. 1-4, a method 40 for mixed-mode logic control for a hydraulic brake system according to aspects of the present disclosure is described. Operation of a command input 106 initiates a braking operation by issuing a command signal 108 to reposition the brake actuator 16 from a first position to a second position relative to the brake assembly 18. The command input 206 may be a brake pedal or other input device operated by a pilot. The command input 106 may also be an automatically initiated braking sequence performed by an aircraft 1000 system (e.g., a landing feature of an aircraft autobrake system). In response to the command signal 108, the mixed-mode control system 118 of the control assembly 100 applies a control signal 110 to the control valve 14 to direct hydraulic fluid from the power source 12 to the brake actuator 16 at a hydraulic fluid flow rate based on a magnitude of the control signal 110 (see Blocks 41, 42).

Concurrent with the braking operation, hydraulic fluid pressure is measured by the at least one pressure sensor 104 and brake actuator 16 position is determined, for example, a flow-based position determined by the flow integrator 100F based on the flow signal 114 from the flow sensor 104 (see Blocks 43-45). The position command 128 and the pressure command 130 are determined based on the position of the brake actuator 16 (i.e., the position error 120) and the pressure of the brake actuator 16 hydraulic fluid (i.e., the pressure error 122) (see Block 46).

The control signal 110 to the control valve 14 is adjusted based on one or both of the position command 128 and the pressure command 130 so as to reposition the brake actuator 16 from the first position to the second position (see Block 47).

In some embodiments, the brake actuator 16 may be repositioned from the second position to the zero torque position (see Block 48). For example, following a braking operation associated with taxiing, the control assembly 100 may adjust the control signal 110 so as to reposition the brake actuator 16 from the second position to the zero torque position. The zero torque position may be a predetermined position. In some embodiments, the zero torque position may be determined by the control assembly 100 based on functional considerations of the braking system 10. For example, following a braking operation the control assembly 100 may determine a new zero torque position based on mechanical properties of the brake assembly 18 (e.g., thermal expansion of brake assembly components).

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A braking system comprising:
    a brake actuator;
    a control valve disposed to direct hydraulic fluid to the brake actuator at a rate corresponding to a magnitude of a control signal;
    at least one pressure sensor disposed between the control valve and the brake actuator and configured to measure a pressure of the hydraulic fluid supplied to the brake actuator; and
    a mixed-mode control system configured to determine a position of the brake actuator, the mixed-mode control system further configured to determine a position command and a pressure command based on the position of the brake actuator and the pressure, respectively, and to adjust the magnitude of the control signal based on both of the position command and the pressure command so as to reposition the brake actuator from a first position to a second position.

2. The braking system of claim 1, further comprising at least one flow detector configured to measure a flow rate of the hydraulic fluid supplied to the brake actuator.

3. The braking system of claim 2, wherein the position of the brake actuator is a flow-based position based on the flow rate of the hydraulic fluid supplied to the brake actuator.

4. The braking system of claim 1, wherein the first position is located at or forward of a zero torque position of the brake actuator.

5. The braking system of claim 4, wherein the mixed-mode control system is configured to determine a new zero torque position, following a braking operation, based on thermal expansion of the brake actuator.

6. The braking system of claim 1, wherein the position command and the pressure command have unequal weight with respect to adjustment of the control signal.

7. The braking system of claim 1, wherein the position command includes a first commanded position of the control valve and the pressure command includes a second commanded position of the control valve and wherein the mixed-mode control system is configured to determine the magnitude of the control signal based on weighted values of the first commanded position and the second commanded position.

8. The braking system of claim 7, wherein the mixed-mode control system is configured to assign more weight to the pressure command and less weight to the position command as the brake actuator is repositioned from the first position to the second position.

9. The braking system of claim 1, wherein the mixed-mode control system is configured to adjust the magnitude of the control signal based on both of the position command and the pressure command in a mixed-mode control region of a length of travel of the brake actuator.

10. The braking system of claim 9, wherein the mixed-mode control system is further configured to adjust the magnitude of the control signal based on only the position command in a position control region of the length of travel of the brake actuator, which is separate from the mixed-mode control region.

11. The braking system of claim 10, wherein the mixed-mode control system is further configured to adjust the magnitude of the control signal based on only the pressure command in a pressure control region of the length of travel of the brake actuator, which is separate from the mixed-mode control region and the position control region.

12. The braking system of claim 10, wherein the position control region includes a running clearance position of the brake actuator.

13. A braking system comprising:
    a brake assembly;
    a brake actuator comprising a brake piston, the brake actuator configured move the brake piston along a length of travel to contact and apply a force to the brake assembly;
    at least one pressure sensor configured to measure a pressure of hydraulic fluid supplied to the brake actuator; and
    a mixed-mode control system configured to determine a position of the brake piston along the length of travel, the mixed-mode control system further configured to determine a position command and a pressure command based on the position of the brake piston and the pressure, respectively, and to control a flow rate of the hydraulic fluid supplied to the brake actuator based on both of the position command and the pressure command so as to reposition the brake piston from a first position to a second position along the length of travel.

14. The braking system of claim 13, further comprising at least one flow detector configured to measure the flow rate of the hydraulic fluid supplied to the brake actuator.

15. The braking system of claim 14, wherein the position of the brake piston is a flow-based position based on the flow rate of the hydraulic fluid supplied to the brake actuator.

16. The braking system of claim 13, wherein the first position is located at or forward of a zero torque position of the brake piston.

17. The braking system of claim 13, wherein the position command and the pressure command have unequal weight with respect to adjustment of the flow rate of the hydraulic fluid.

18. The braking system of claim 13, wherein the mixed-mode control system is configured to assign more weight to the pressure command and less weight to the position command as the brake piston is repositioned from the first position to the second position.

19. The braking system of claim 13, wherein the mixed-mode control system is configured to adjust the flow rate of the hydraulic fluid based on both of the position command and the pressure command in a mixed-mode control region of the length of travel of the brake piston.

20. The braking system of claim 19, wherein the mixed-mode control system is further configured to adjust the flow rate of the hydraulic fluid based on only the position command in a position control region of the length of travel of the brake piston, which is separate from the mixed-mode control region.

* * * * *